United States Patent [19]

Anderson

[11] 4,452,111
[45] Jun. 5, 1984

[54] ADJUSTABLE DISK AND DRUM LATHE MECHANISM WITH AUTOMATIC DRIVE

[75] Inventor: Vyron E. Anderson, Cedar Rapids, Iowa

[73] Assignee: Kwik-Way Manufacturing Company, Marion, Iowa

[21] Appl. No.: 380,046

[22] Filed: May 20, 1982

[51] Int. Cl.³ .......................... B23B 5/02; B23B 21/00
[52] U.S. Cl. ........................................ 82/4 A; 82/24 R
[58] Field of Search ...................... 82/4 A, 4 R, 24 R; 51/132

[56] References Cited

U.S. PATENT DOCUMENTS

| | | | |
|---|---|---|---|
| 2,663,975 | 12/1953 | Barrett | 82/4 A |
| 3,026,752 | 3/1962 | Zabel | 82/12 |
| 3,049,953 | 8/1962 | Barrett | 82/24 R |
| 3,079,731 | 3/1963 | Rawstron et al. | 82/12 |
| 3,245,292 | 4/1966 | Kushmuk | 82/24 R |
| 3,442,164 | 5/1969 | Blazek | 82/24 R |
| 3,500,589 | 3/1970 | Ellege | 82/4 A |

FOREIGN PATENT DOCUMENTS

| | | | |
|---|---|---|---|
| 2540187 | 3/1977 | Fed. Rep. of Germany | 82/4 A |
| 2745111 | 4/1979 | Fed. Rep. of Germany | |
| 2804840 | 8/1979 | Fed. Rep. of Germany | |

*Primary Examiner*—Leonidas Vlachos
*Attorney, Agent, or Firm*—Hill, Van Santen, Steadman & Simpson

[57] ABSTRACT

A motor drive means for a disk cutting machine which allows automatic motor feed of the cutting tools. The invention also provides for mounting brackets so that the normally vehicle mounted machine can be mounted on a lathe so as to cut disks mounted in the lathe.

3 Claims, 7 Drawing Figures

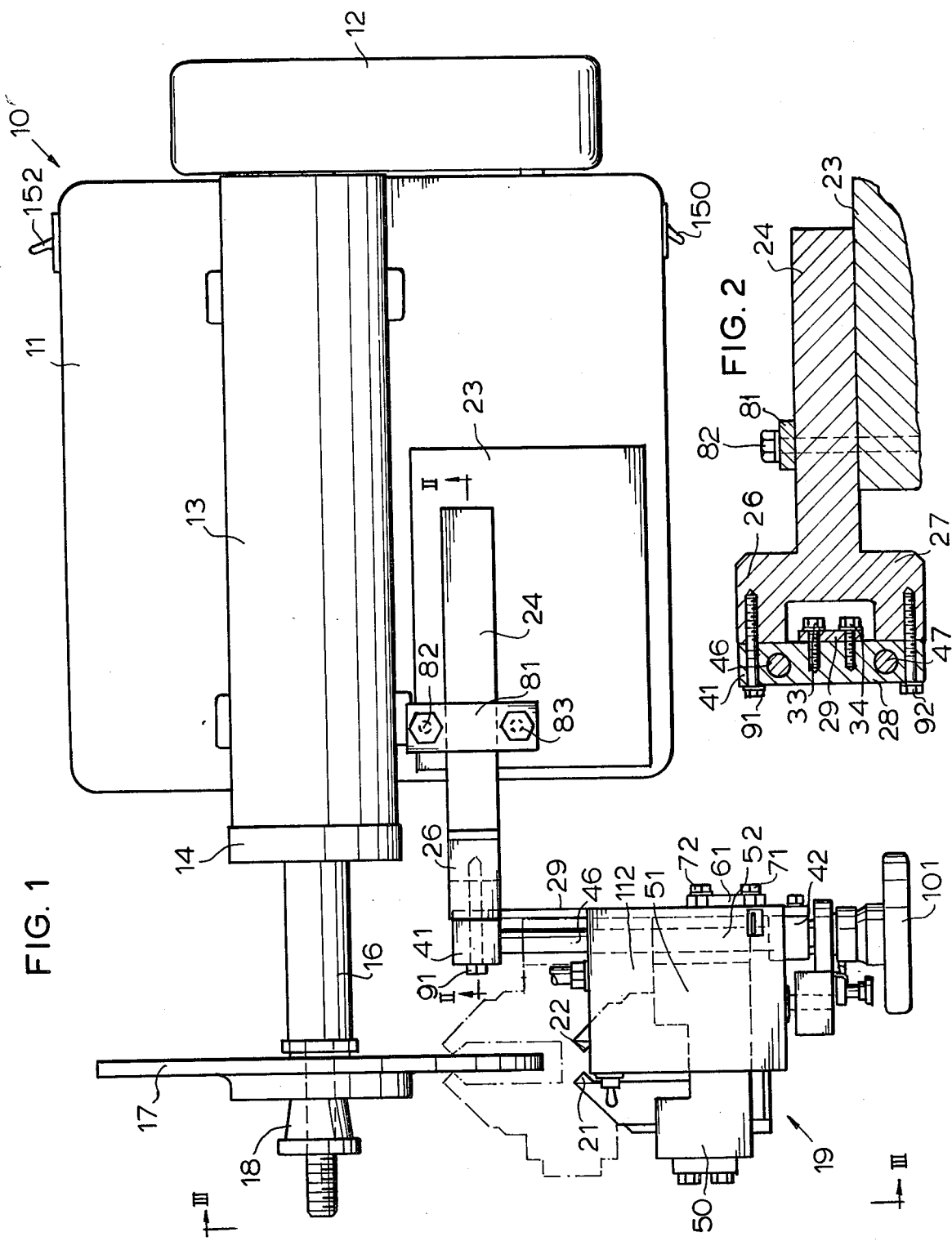

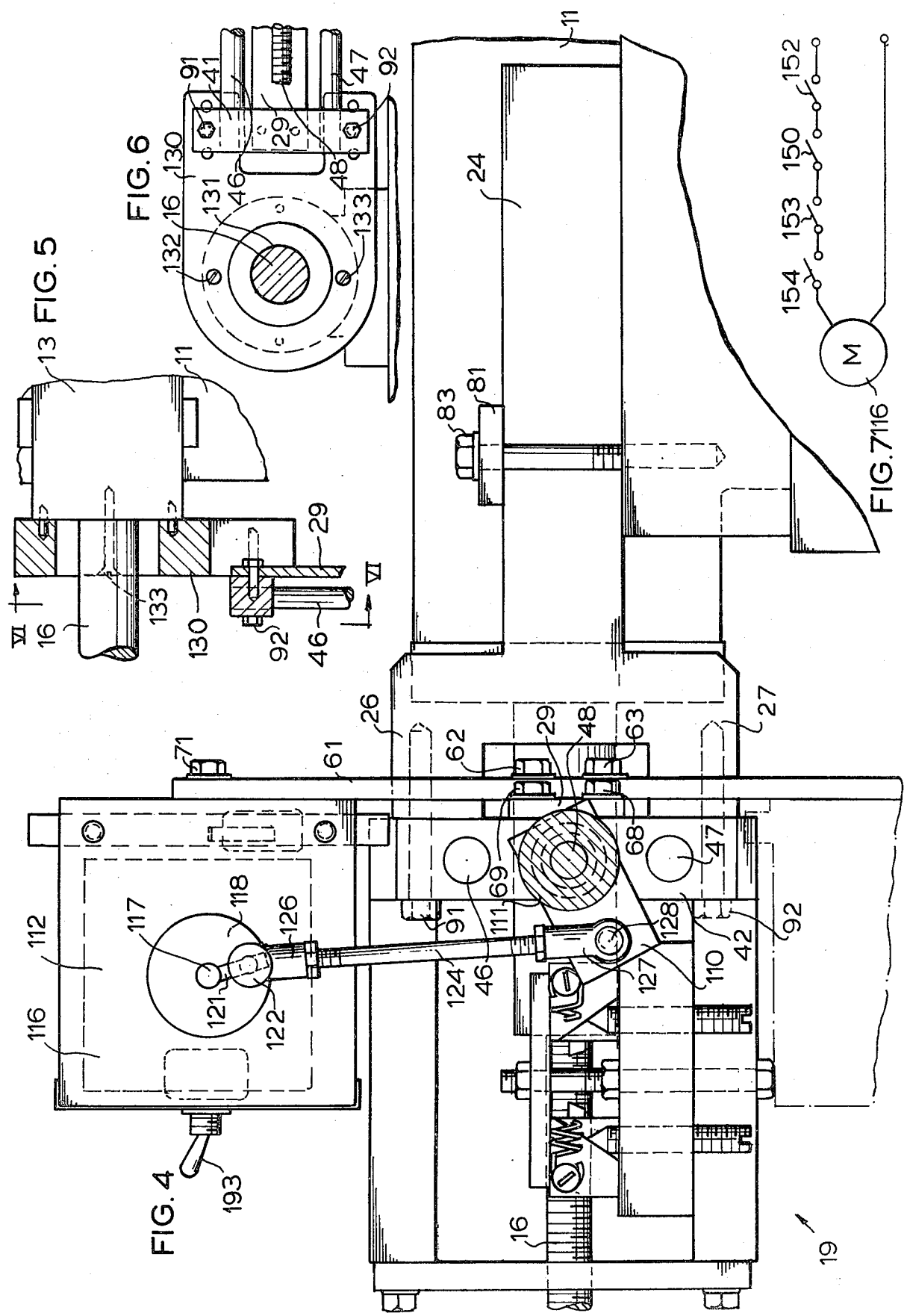

ADJUSTABLE DISK AND DRUM LATHE MECHANISM WITH AUTOMATIC DRIVE

BACKGROUND OF THE INVENTION

1. Field of the Invention

This invention relates in general to machines for cutting and resurfacing disks and drums as, for example, for brake disk and drums and in particular to a novel motor driven arrangement.

2. Description of the Prior Art

For cutting and resurfacing brake drums and disks lathes are known wherein the drum or disk is chucked in the lathe and rotated as the surfaces are cut and polished. Brake disk cutting units for mounting on the caliber mounting brackets of vehicles have recently come in to use wherein the cutting unit is mounted on the vehicle and the wheel is driven as the cutters are manually actuated so as to resurface the disk.

SUMMARY OF THE INVENTION

It is an object of the present invention to provide for automatically driving the cutting tools of a disk cutting machine which can be mounted on the caliber brackets of a vehicle and which can also be mounted on a prior art type brake disk and lathe so as to resurface disks.

It is another object of the invention to provide an automatic motor drive mechanism for a disk resurfacing machine.

A further object is to provide a mounting bracket arrangement for a disk cutting machine.

Yet another object is to provide a motor drive mechanism for a disk cutting machine.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a top plan view illustrating the invention;

FIG. 2 is a sectional view taken on line II—II of FIG. 1;

FIG. 4 is a sectional view taken on line IV—IV from FIG. 3;

FIG. 5 is a sectional view of a modification of the invention;

FIG. 6 is a plan view illustrating the modified support bracket of the invention; and FIG. 7 illustrates the electrical circuit.

DESCRIPTION OF THE PREFERRED EMBODIMENTS

Figure 3:
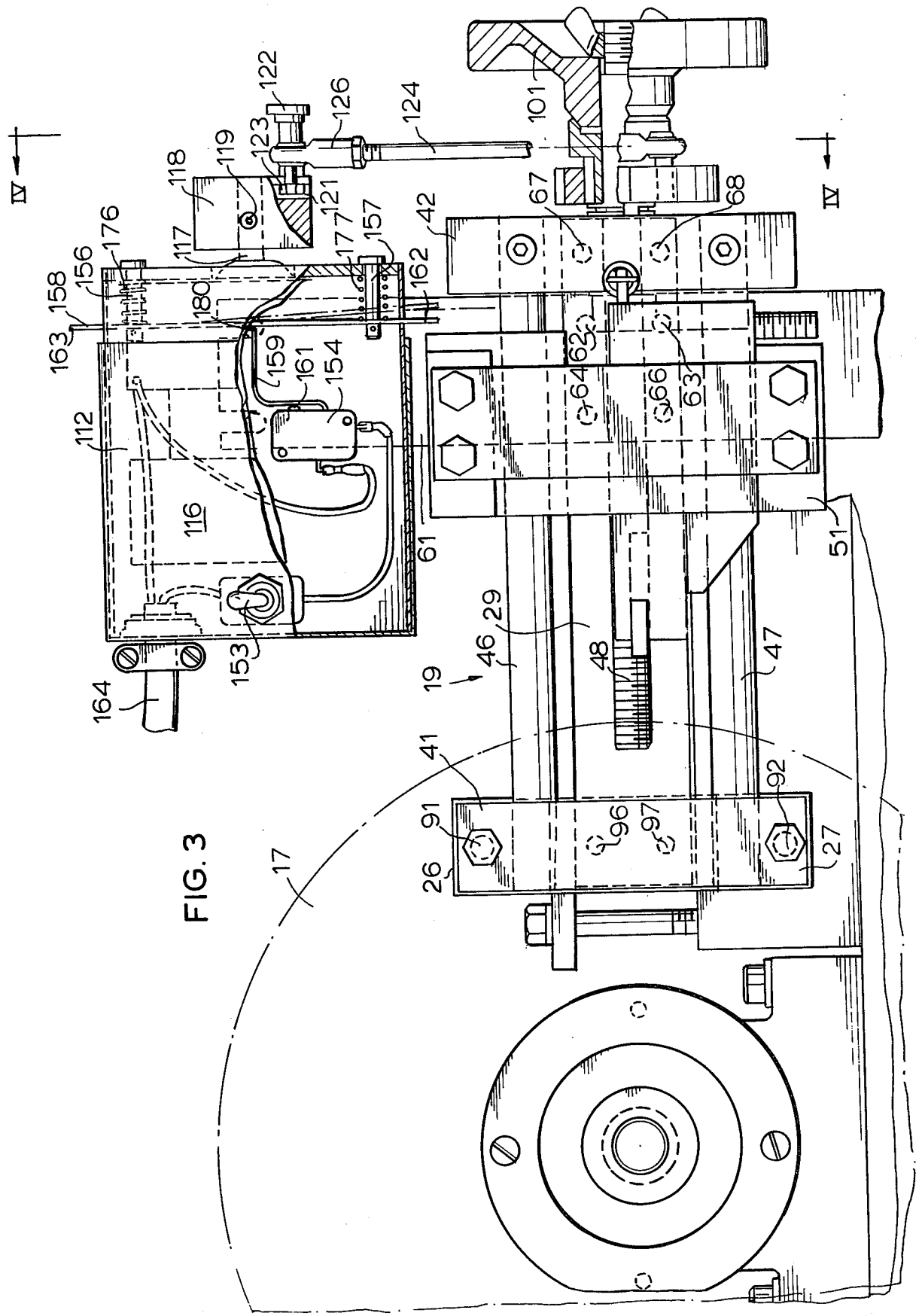
FIG. 3 is a side plan view illustrating the invention.

FIG. 1 illustrates a lathe 10 with a drive means 12 as, for example, a motor which has a spindle bearing support 13 in which a spindle 16 is rotatably supported and a bearing retainer 14 is attached about the spindle 16 to the support 13. The frame 11 of the lathe carries a bed plate 23 upon which the support bracket 24 illustrated in FIGS. 1, 2 and 4 is supported. The bracket 24 is mounted to the member 23 by bolts 82 and 83 and a plate 81 which locks it to the member 23. The outer end of the bracket 24 has legs 26 and 27 formed with end openings into which bolts 91 and 92 can be threadedly received to attach a portable lathe 19 which has a guide block 41 through which the bolts 91 and 92 extend to lock the portable lathe 19 to the bracket 24. A longitudinal support plate 29 is attached to the block 41 by bolts 96 and 97 shown in FIG. 3 and the other end of the member 29 is attached to bar 42 by bolts 67 and 68. The cutting tools 21 and 22 of the portable lathe are attached to a member 50 which has a portion 51 which is threadedly received on a lead screw 48 which is rotatably supported in block 42 and to which a hand knob 101 is attached. The member 51 is formed with openings through which the guide rods 46 and 47 pass and as the knob 101 is rotated to rotate the lead screw 48 the member 51 is driven along the guide rods 46 and 47 by the lead screw 48 so as to move the cutting tools relative to the disk 17 which is chucked on the spindle 16 by a locking nut 18 as illustrated in FIG. 1.

A link 110 is connected to a one-way clutch 111 such that as the link 110 is oscillated the member 51 will be driven on the lead screw 48 in a direction so as to move the cutting tools 21 and 22 in a direction away from the center of the disk 17 as machining occurs. A drive motor mechanism 112 is mounted to the portable lathe 19 by a plate 61 which is connected to motor means 112 by bolts 71 and to member 29 by bolts 62 and 63. The member 61 extends down below the leg 27 of the bracket 24 so that the motor means 112 can be inverted relative to the portable lathe when desired by loosening the bolt 71 and swinging the unit down to the lower end of the rod 61 to attach it at the lower end thereof. The motor unit 112 includes a motor 116 which is geared to an output shaft 117 that carries an arm throw adjusting disk 118 which is connected to shaft 117 by suitable set screw 119. As illustrated in FIGS. 3 and 4, a slot 121 is formed in the disk member 118 and a thumb screw with locking end 122 is received in the slot 121 and has an end 123 which can be locked at selected radial positions in the slot 121. A crank arm 124 has a bearing member 126 which is rotatably mounted on the shaft of the set screw 122 and is threadedly received in a bearing member 127 which is pivotally connected by shaft 128 to the link 110. When motor 116 is actuated, the shaft 117 drives disk 118 which in turn drives the crank arm 124 which drives the link 110 to oscillate it back and forth so as to drive the cutting tools 21 and 22 relative to the disk due to the action of the one-way clutch 111 and the lead screw 48.

FIG. 2 is a sectional view through the bracket 24 and illustrates the connection of the member 29 which is connected by bolts 33 and 34 to the block 41.

FIGS. 5 and 6 illustrate a modification of the invention wherein the bracket 24 is replaced by a bracket 130 which has a center opening 131 which passes over the spindle 16 and has openings through which bolts 132 and 133 can be threadedly received into the spindle support 13 so as to lock the bracket 130 to the spindle support 13 of the lathe. The bracket 130 is formed with openings into which bolts 91 and 92 can be received to lock the block 41 of the portable lathe 19 to the lathe 10. The member 29 and guide rods 46 and 47 are illustrated and the end of lead screw 48. In this embodiment the bearing retainer 14 is removed and replaced by the bracket 130.

The motor 116 of the motor drive 112 receives power from a suitable power cord 164 so as to drive the motor 116 when the switch 153 is on. Automatic turn-off switch 154 is also mounted in circuit with the motor and the switch 153 and has a contact 161 which is engageable by member 159 that is connected to a cross-member 158 that is moveably supported on shafts 156 and 157 of the motor support 112 and has ends 162 and 163 which extend outwardly therefrom. The springs 176 and 177 normally bias the member 158 and member 159 so that the switch contact 161 is depressed thus closing switch 154. Thus, under these conditions switch 154 will apply power to the motor 116 when switch 153 is closed. When the member 51 moves to the right relative to FIG. 3, it engages the end 162 of member 158 as the cutting tools near the end of their travel and this causes the member 158 to move to the right thus moving the member 159 to the right, thus, allowing the switch contact 161 to be released opening switch 154 which will turn off the drive motor 117. Also, if the motor drive unit 112 is mounted on the lower end of the portable lathe, the member 51 will engage the upper end 163 of member 158 to open switch.

The lathe 150 has a pair of switches 150 and 152 which are mounted on opposite sides of the lathe so that the lathe drive motor 12 can be stopped from either side of the lathe by an operator. It is undesirable for the cutters 21 and 22 to move relative to the disk 17 when the disk 17 is not being driven by the motor 12 and, thus, the power applied by cord 164 is from a power source in series with the switches 150 and 152 so that when either switch 150 or 152 is opened, the tool drive motor 116 will also be de-energized. The motor 116 will also be de-energized when the automatic switch 154 is opened due to the engagement of member 51 with bar 158.

In prior art devices the cutting tools 21 and 22 were manually moved by the operator by turning the hand wheel 101. In the present invention the operator moves the cutting tools manually to the starting position which is at the inner braking radial surface of the disk and provides for a cut of a depth which he sets in the conventional manner. Then the lathe motor 12 is energized to turn the disk and the motor 116 is energized to automatically move the cutter tools 21 and 22 outwardly on the disk to machine it. The one-way clutch 111 and member 124, 110 and 118 will turn the lead screw 48 to move the tools 21 and 22 outwardly to make the cut. Switch 154 will turn motor 116 off when the cut has been completed.

It is to be realized that although the motor 116 drive is shown in use with a lathe with motor 12, the motor 116 can be used when the machine is mounted on a vehicle to provide automatic feed.

It is seen that the present invention provides an automatic motor drive for the disk cutting tools and allows a portable lathe to be quickly and easily mounted on a lathe.

Although it has been described with respect to preferred embodiments thereof it is not to be so limited as changes and modifications may be made therein which are within the full intended scope of the invention as defined by the appended claims.

I claim as my invention:

1. An automatic drive mechanism for a portable disk cutting machine adapted to be mounted on a machine comprising a support member attached to said machine, a pair of cutting tools for machining opposite sides of a disk moveably mounted on said support member, drive means connected to said disk to rotate it, a manual means coupled to said cutting tools for radially moving said cutting tools relative to the disk, and a motor means mounted on said support member and coupled to said cutting tools to move them in a single direction relative to said disk, wherein said cutting tools are driven in or out by a lead screw and said manual means and said motor means are coupled to said lead screw to move said cutting tools, including a one-way clutch connected between said motor means and said lead screw so as to cause said motor means to drive said cutting tools in a single direction, wherein said motor means drives a crank, a link connected to said one-way clutch, and a crank arm connected between said link and said crank, wherein said crank comprises a plate member formed with a slot and an adjusting member attached to one end of said crank arm and adjustably receivable in said slot to adjust the throw of said crank arm, and including a motor switch for said motor means motor switch actuating means, means on said cutting tool support for engaging said motor switch actuating means and opening said motor switch adjacent one end travel of said cutting tools.

2. An automatic drive means according to claim 1 whereinsaid adjusting member includes a thumb screw for adjusting and locking said one end of said crank arm in said slot.

3. An automatic drive means according to claim 1 wherein said motor switch actuating means includes a spring biased bar which has a portion engageable by said cutting tool support and said bar engageable with said motor switch so that said motor means is deactuated at one end of travel.

* * * * *